(12) United States Patent
Habon et al.

(10) Patent No.: US 7,412,652 B2
(45) Date of Patent: *Aug. 12, 2008

(54) GENERATION OF TRAINING OBJECTS

(75) Inventors: Michael W. Habon, Frickingen (DE);
Joerg H. Habon, Immenstaad (DE);
Harald L. Falter, Lindau (DE); Axel Luther, Wiesloch (DE); Ursula A. C. Markus, Saarbrücken (DE); Uwe W. Sester, Ladenburg (DE); Paul P. Tanzer, Überlingen (DE); Rainer P. B. Zinow, Neustadt (DE); Kurt R. Bauer, Wiesloch (DE)

(73) Assignee: SAP AG, Walldorf (DE)

( * ) Notice: Subject to any disclaimer, the term of this patent is extended or adjusted under 35 U.S.C. 154(b) by 545 days.

This patent is subject to a terminal disclaimer.

(21) Appl. No.: 11/048,275

(22) Filed: Jan. 31, 2005

(65) Prior Publication Data

US 2006/0047672 A1    Mar. 2, 2006

(51) Int. Cl.
*G06F 13/00* (2006.01)
*G06F 15/00* (2006.01)

(52) U.S. Cl. .................................. 715/705; 715/513
(58) Field of Classification Search ................ 715/705, 715/523, 500, 763–765, 503, 513, 853; 709/209, 709/203, 223
See application file for complete search history.

(56) References Cited

U.S. PATENT DOCUMENTS

| | | | | |
|---|---|---|---|---|
| 5,566,291 A | * | 10/1996 | Boulton et al. | 715/709 |
| 6,014,134 A | * | 1/2000 | Bell et al. | 715/705 |
| 6,996,768 B1 | * | 2/2006 | Elo et al. | 715/500 |

* cited by examiner

*Primary Examiner*—Cao "Kevin" Nguyen
(74) *Attorney, Agent, or Firm*—Kenyon & Kenyon LLP

(57) ABSTRACT

The generation and adjustment of a training object allows for the customized training for a user on a software application. Based on a user identification, the training object may be generated to cover targeted topics for learning while avoiding extraneous subject matter. The training object is generated using knowledge transfer modules composed of knowledge transfer objects. The selection of the knowledge transfer objects is determined based on attributes associated with a user identification and factors associated with the identified user. Therefore, when the user accesses and executes a training object associated with the specific user, the training objects provide directed and targeted training.

14 Claims, 5 Drawing Sheets

---

LEARNING MAP 1 : KTM 3 ◄———— 222

| TITLE | MANDATORY | DURATION | STATUS | RATING |
|---|---|---|---|---|
| ACTIVITY 1<br>DESCRIPTION OF ACTIVITY | YES | 6 MIN | | |
| ACTIVITY 2<br>DESCRIPTION OF ACTIVITY | NO | 6 MIN | FINISHED | ● ● ● ○ |
| ACTIVITY 3<br>DESCRIPTION OF ACTIVITY | YES | 8 MIN | | |
| ACTIVITY 4<br>DESCRIPTION OF ACTIVITY | NO | 5 MIN | FINISHED | ● ● ○ ○ |

220
224   226   228   230   232

| LEARNING MAP 1 ←——202 | | | | |
|---|---|---|---|---|
| TITLE | MANDATORY | DURATION | STATUS | RATING |
| KTM 1<br>DESCRIPTION OF ACTIVITY | YES | 22 MIN | | |
| KTM 2<br>DESCRIPTION OF ACTIVITY | NO | 34 MIN | FINISHED | ● ● ● ○ |
| KTM 3<br>DESCRIPTION OF ACTIVITY | YES | 25 MIN | | |
| KTM 22<br>DESCRIPTION OF ACTIVITY | NO | 17 MIN | | ●I●S⊕E◌ |

FIG. 5

| LEARNING MAP 1 : KTM 3 ←——222 | | | | |
|---|---|---|---|---|
| TITLE | MANDATORY | DURATION | STATUS | RATING |
| ACTIVITY 1<br>DESCRIPTION OF ACTIVITY | YES | 6 MIN | | |
| ACTIVITY 2<br>DESCRIPTION OF ACTIVITY | NO | 6 MIN | FINISHED | ● ● ● ○ |
| ACTIVITY 3<br>DESCRIPTION OF ACTIVITY | YES | 8 MIN | | |
| ACTIVITY 4<br>DESCRIPTION OF ACTIVITY | NO | 5 MIN | FINISHED | ● ● ○ ○ |

FIG. 6

GENERATION OF TRAINING OBJECTS

BACKGROUND

The present invention relates generally to the area of software training and more specifically to generating training objects capable of being executed within a software application.

Success of a new software application depends on the ability of users to effectively learn and utilize the software. Unfortunately, nearly all computer software today is designed around processing data with little or no consideration of how people need to use it to perform their work tasks. As a result, user training, software documentation and end user support services have flourished as a way to help users figure out how to work around these systems.

Current software training approaches include general classroom training sessions, online tutorials and third party training resources. These systems typically employ a general teaching approach to accommodate the wide variety of users. These training approaches cannot provide individual customized training. Thus the users are often limited in their training for utilizing the new software, reducing productivity.

With continued advancements in software applications, it is important to keep users abreast of new techniques. If users fail to grasp the improvements of existing systems, these shortcomings will only be perpetuated with new systems. This is problematic because after several generations of new technologies, the user may be severely restricted in the ability to use the software, increasing the likelihood that the user will not use the improved software, but will reduce productivity using the comfortable previous generation software system.

Current training techniques also utilize hands-on training. For example, some systems may utilize pop-up windows having visual demonstrations of a particular application resource. Other approaches may include a user prompting a system to run a tutorial when the user first launches a software package or is confused during operation.

As noted above, the approaches are also standard approaches offering no customization for specific users. As the complexity of the underlying software increases, the software training techniques must also be customizable to focus on the target audience of the intended user.

Also, the generation of those software training techniques are generalized. As a software application is generated, the general training materials are also created. Other software training techniques, such as classroom training techniques, are generated to teach a large group of varied users. Current training approaches fail to provide a customized learning approach because individualized training techniques are not generated. Therefore, there exists a need for generating software training objects that are customized to target specific users.

BRIEF DESCRIPTION OF THE DRAWINGS

FIG. 5 illustrates a graphical representation of a visible display of a learning map; and FIG. 6 illustrates a graphical representation of a visible display of a knowledge transfer module.

DETAILED DESCRIPTION

Through a training object, users are provided with directed training techniques consistent with their intended usage of a software application. Focusing on training activities consistent with the users intended use of the software application reduces the time associated with learning the new software. Furthermore, time-sensitive training improves the effectiveness of training by training the user just prior to actual performance of the software functionality.

Customized training objects are generated based on the user identification so that when a user access the software, the customized training objects are seamlessly integrated into the usage and training of the software. The customized training objects provide targeted training based on the activities the user encounters with the software application. For example, if the user is within the billing department, the training objects may focus more specifically on accessing billing information compared with a sales manager who may focus more on using the software for sales projections.

Improving user performance includes using an interface focused on the end user role and tasks. Rather then sending users to wade through extensive training materials or documentation, the system provides concise procedural steps for the task the user has to perform. Moreover, through generating the customized training objects outside of the underlying software application, personalized training is allowed for various users of the same underlying software application.

Figure 1:
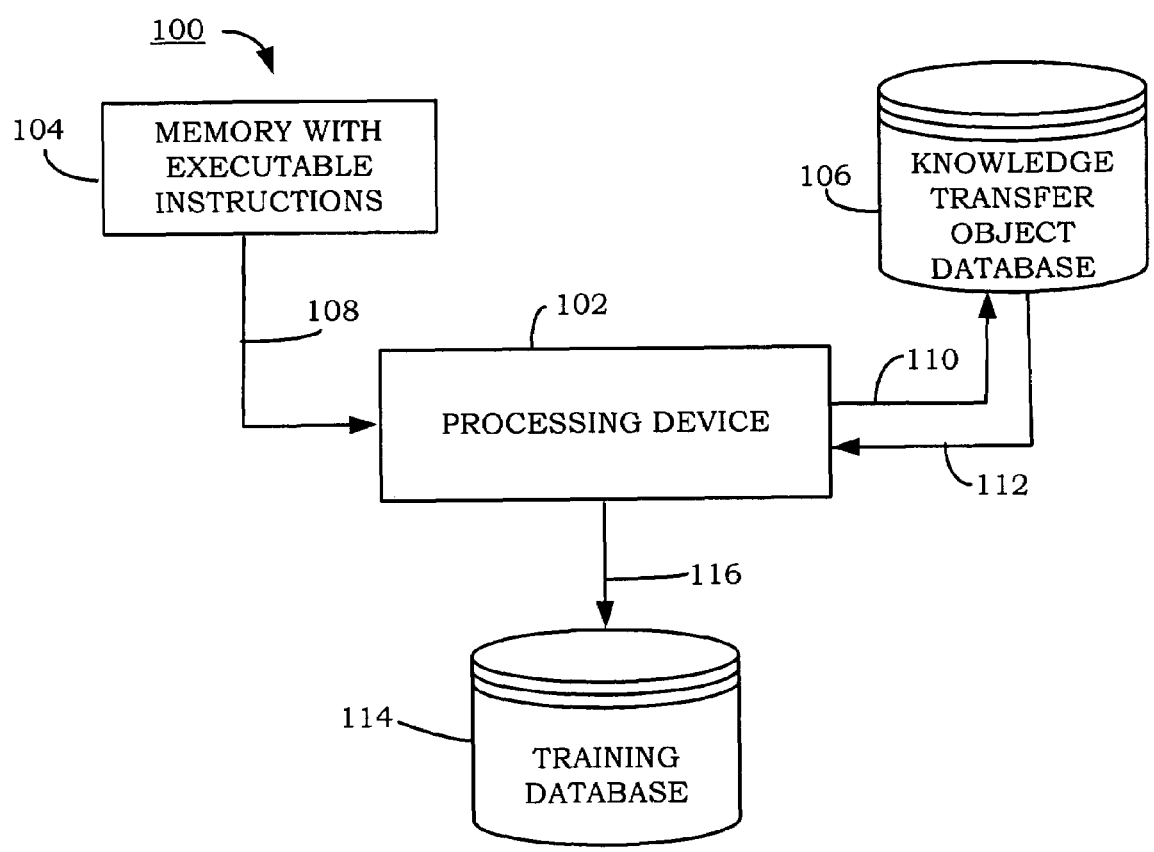
FIG. 1 illustrates a block diagram of one embodiment of an apparatus for generating a training object.

FIG. 1 illustrates an apparatus 100 that is capable of generating a training object. The apparatus 100 includes a processing device 102, a memory having executable instructions stored therein 104 and a training database 106, where the training database 106 has multiple knowledge transfer objects (KTOs) stored therein.

The processing device 102 may be, but not limited to, a single processor, a plurality of processors, a DSP, a microprocessor, an ASIC, a state machine, or any other implementation capable of processing and executing software. The term processor should not be construed to refer exclusively to hardware capable of executing software and may implicitly include DSP hardware, ROM for storing software, RAM, and any other volatile or non-volatile storage medium. The memory 104 and database 106 may be any suitable memory or storage location operative to store sales information or any other suitable information therein including, but not limited to, a single memory, a plurality of memory locations, shared memory, CD, DVD, ROM, RAM, EEPROM, optical storage, microcode, or any other non-volatile storage capable of storing information.

The KTOs stored within the KTO database 106 are data structures that store data capable of being executed by a processing device. The KTOs also store other information, such as, but not limited to, header information, meta-data describing the contents of the KTO, self-test operations, active linking to remedial learning opportunities and explanation/demonstration of new operations through overviews and simulations. The KTOs provide direct training information that can be shared, reused, and/or repurposed for multi-format delivery of educational products, such as instructor-led training (ILT), e-learning, live/virtual classroom sessions, just-in-time learning. The KTO facilitates training activities for mastering a single, specific learning objective associated with the operation of the underlying software application.

The processing device 102 receives executable instructions 108 from the memory 104. In response thereto, the processing device 102 accesses the KTO database 106 using an access command 110. The access command 110 includes information associated with a user identifier. In one embodiment, the access command 110 may include data representation of the user and in another embodiment, the access command 110 may include other suitable types of user identifiers. For example, if the user identifier indicates a particular user skill level, such as novice, intermediate or advanced, the access command 110 may indicate the retrieval of KTOs associated with that designation. In the other embodiment, the access command may include the user level designation and the database 106 may use this designation to access specific KTOs. In another embodiment, the user identifier may be a user's actual login identifier which may be referenced to determine to the appropriate KTOs. The user identifier may also be a usage-type indicator which is used to determine how the user will be using a software application to determine the appropriate KTOs, or the user identifier may be any other suitable indicia capable of allowing for the retrieval of pertinent KTOs from the database 108.

Upon selecting various KTOs based on the user identifier, the processor 102 may receive an input signal 112 from the database 106, where the input signal 112 includes the KTOs. The KTOs are then compiled to generate the training object, including assembling the KTOs into knowledge transfer modules (KTMs) and generating a learning map from the KTMs.

A learning map is a general data structure within the training object, including KTMs. The learning map also includes other information, such as header information and meta-data describing the contents of the learning map and the KTMs. Based on the structure of the learning map, any suitable number of different KTMs may be contained therein, allowing for a high degree of flexibility in the scope of the data in the learning map. In one embodiment, the KTMs are designated by associated workset headings to define the general training operation.

The KTMs are data structures that store further data structures of the KTOs. The KTMs also store other information, such as header information and meta-data describing the contents of the KTM and pretest applications (as discussed in further detail below). Based on the structure of the KTM, any suitable number of different KTOs may be contained therein, allowing for a high degree of flexibility in the scope of the data in the KTM.

The processing device 102 of FIG. 1 is also in communication with a training database 114, which may be any suitable database similar to the database 106. The processing device 102, upon generating the training objects, writes training objects 116 to the training database 114. These training object 114 include an association with the user identifier so that a software application may access the training database 114 to retrieve the training object.

Figure 2:
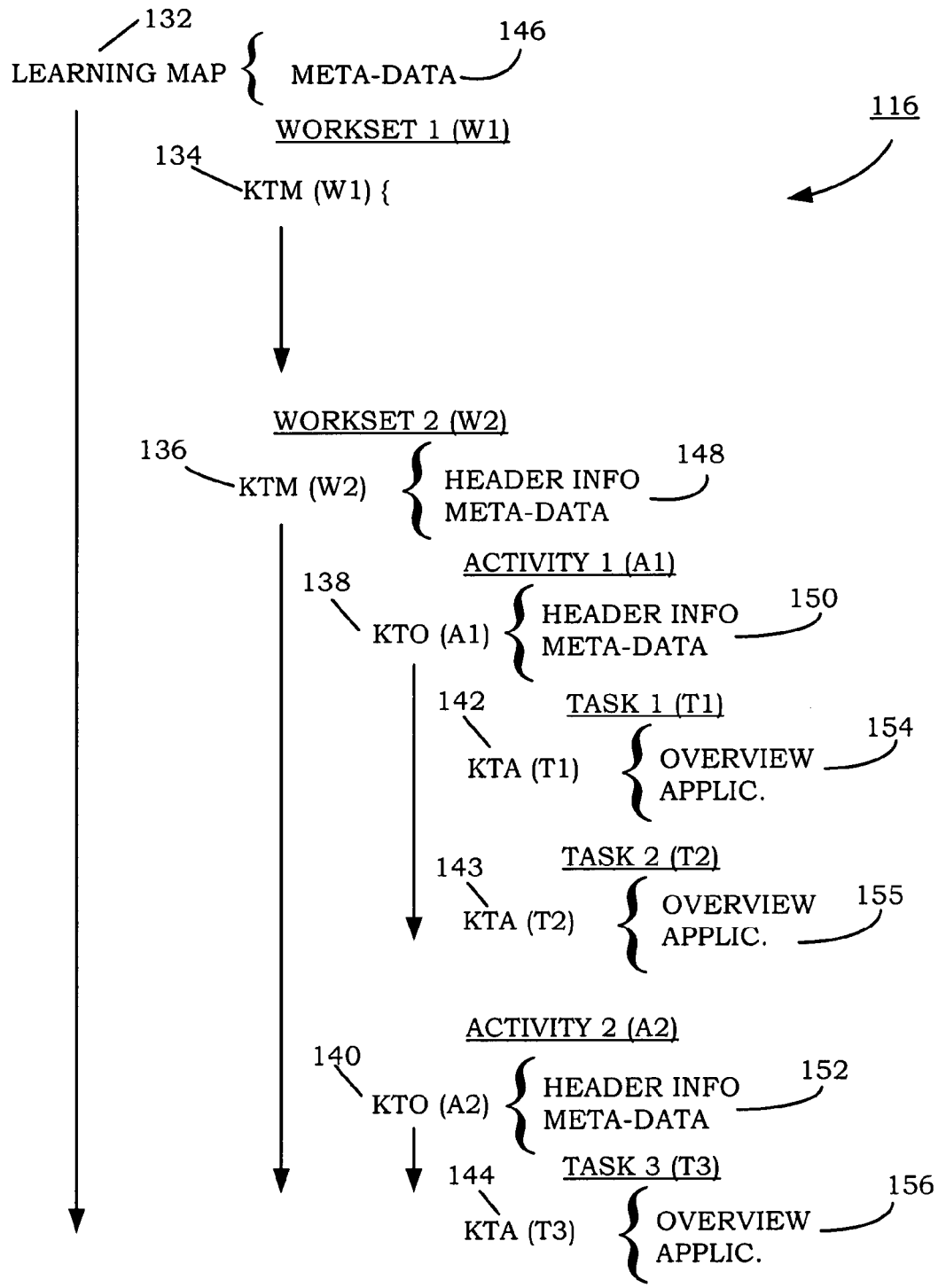
FIG. 2 illustrates a graphical representation of an exemplary portion of encoding of a training object.

FIG. 2 illustrates one embodiment of a data hierarchy for a training session encoded within a training object 116. The learning map 132 includes the KTMs 134 and 136 which include KTOs 138 and 140 that includes KTAs 142-144. KTAs 142-144 are specific executable operations that when executed by the processing device, generate the training materials. The KTAs 142-144 include specific individualized learning elements, such as a multi-media display, a text file, a sound file, an interactive form or any other output.

The learning map 132 includes other information 146, such as header information and meta-data. The KTMs 134 and 136 and KTOs 138 and 140 also store other information 148 and 150-152, respectively, such as header information and meta-data. Moreover, the KTAs include overview data and application data 154-156 where the overview data describes the contents of the application and the application data is the executable training operation.

The learning map 132 is associated with an indicated user, such as through a login, a group of users, a user grouped into a skill level rating or any other suitable indicator of a particular user seeking to perform a computing activity capable of being enhanced by the training objects. The associating may be done by inserting header information or meta-data information within the learning map. In another embodiment, external references may be utilized, such as a look-up table to allow for a single learning map to be associated to any number of users. Any other suitable technique as recognized by one having ordinary skill in the art may be utilized to associate the learning map with the user identification.

In one embodiment, the learning map 132 provides performance-based self-tests. In this self-test application, the application does not provide prompts and expects the user to complete an activity without guidance or direct feedback. The self-test keeps scoring information and shows the user's ability at the end of the self-test. When the user has successfully completed the simulation, the status of work on the KTO may be automatically set as completed and the objective may be marked as mastered. As described below, one embodiment includes a master list of training objects relating to a particular user. This master list may be stored in a readily accesible memory location such that the list may be used to determine a proper training object for a user by eliminating extraneous KTOs.

In one embodiment, the KTA can be described with sharable content object reference model (SCORM) metadata to allow for searching the training objects database. In one embodiment, the KTOs and KTMs are also displayable with a SCORM Player. The structure of the KTO is similar to the KTAs so that users are free to decide which KTOs or specific KTAs within the KTOs, the user wants to work on first. In one embodiment, this may be accomplished using a visual interactive interface illustrating a graphical representation of the various KTAs that make up the KTO, wherein a user may actively select one or more of the KTAs for execution.

Figure 3:
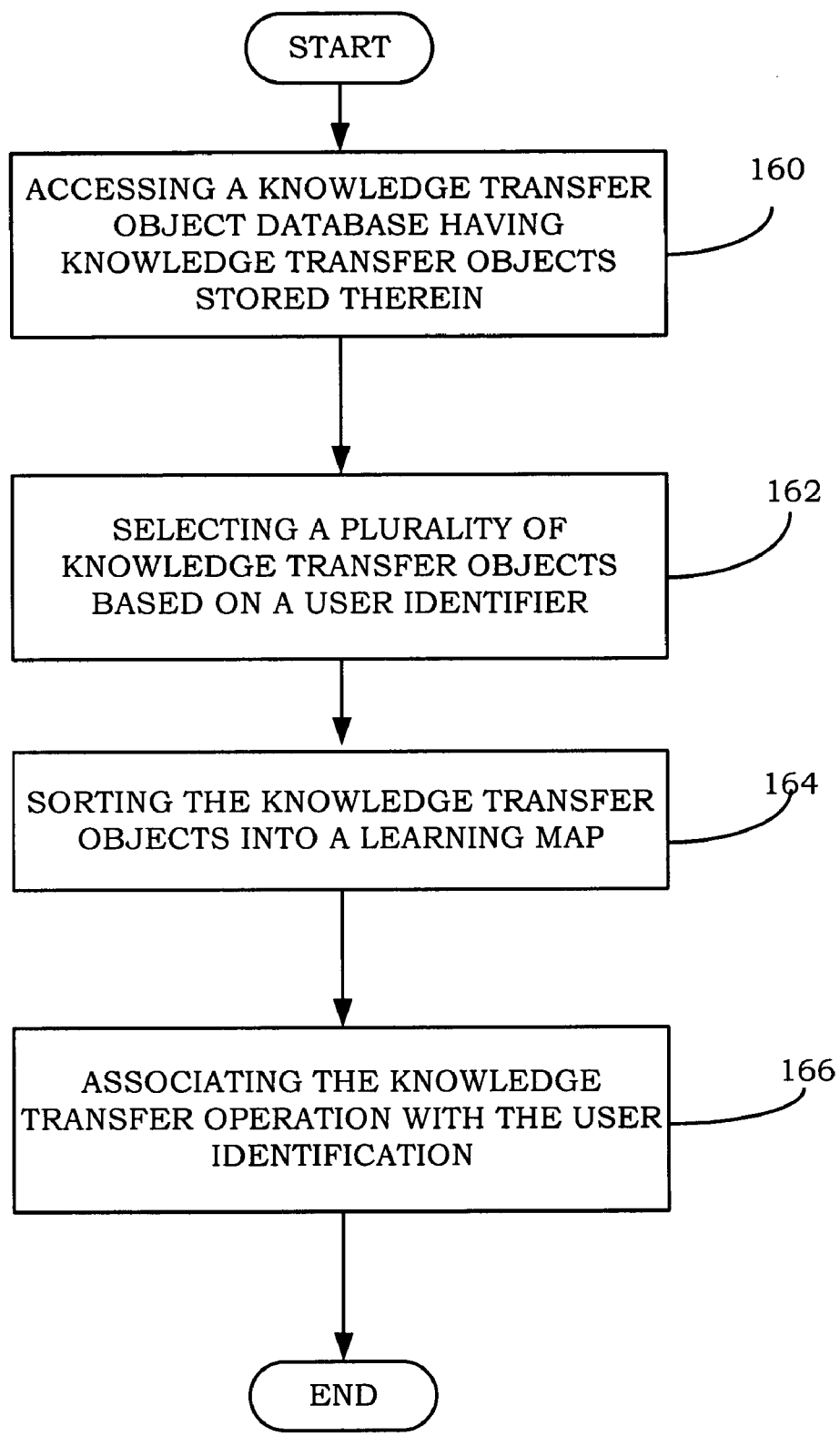
FIG. 3 illustrates a flow chart of the steps of one embodiment of the generating the training object.

FIG. 3 illustrates the steps of one embodiment of the generation of the training object. The method begins by accessing a training database that includes KTOs stored therein, step 160, such as the database 106 of FIG. 1 having KTOs 134 and 136 of FIG. 2, stored therein. The next step, step 162, is selecting a plurality of the KTOs based on a user identifier. Similar to the above discussion with respect to FIG. 1, any suitable user identifier may be used to determine the appropriate content for the training object. For example, KTOs may include a difficulty level such that if a user is determined to be below a specific user-rating level, the KTOs would be designated for being used in a training session with the particular user. In another example, the KTOs may include a user-role indicator so that if the user is determined to fulfill that particular role, such as a salesman for accessing sales information, the KTOs would be designated for being used in a training session with the particular user.

The next step, step 164, includes sorting the KTOs into a learning map. Similar to the learning map 132 of FIG. 2, the various KTOs retrieved from the database are sorted into designated KTMs. The KTMs are then formatted into the learning map to provide structure to the training session. This step may be performed by assembling various KTOs based on criteria as referenced by the user identifier. For example, if a user is deemed to be a novice, the KTOs associated with a novice are retrieved. Then, if the learning map is focused on a particular function and the KTOs associated with that function are assembled. For example, if the function is to generate a form letter, KTOs associated with using a word processing device to generate the form letter would be assembled. Therefore, based on the user identification and the appropriate activity of the learning map, the proper KTOs are assembled.

The next step, step 166, is associating the training object with the user identification. This step allows for later access by a user for the customized training. For example, if the user is a novice user that operates the underlying software application for monitoring inventory, the KTOs retrieved from the database may provide a higher level of detail to all steps of software training associated with monitoring inventory. This greater level of detail in the learning map would include more KTOs having the KTAs therein. This step of associating the operation would then provide a reference for when the novice user attempts to perform a computing event subject to training, the underlying software application may readily access and retrieve the appropriate customized training object.

Figure 4:
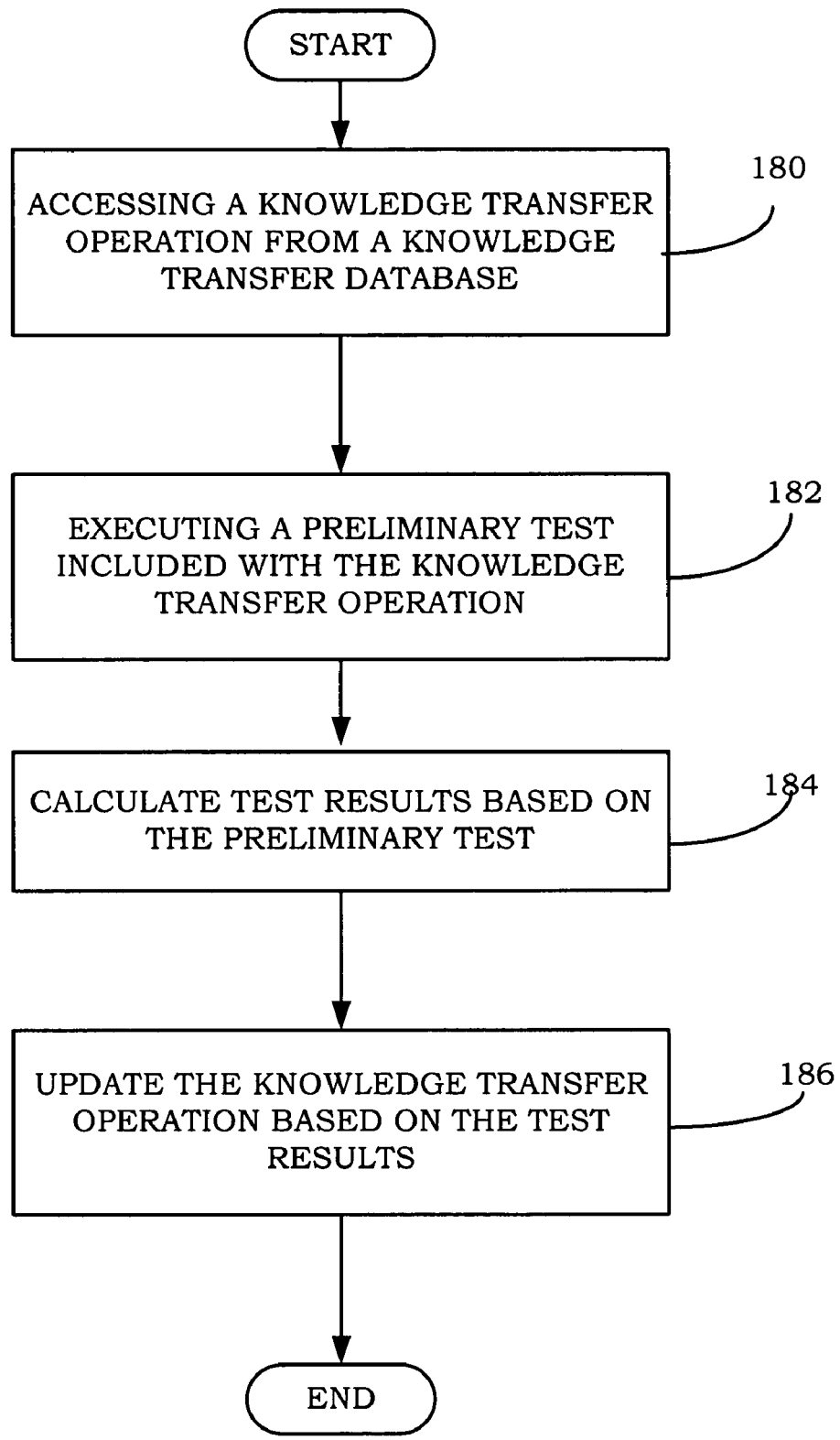
FIG. 4 illustrates a flow chart of the steps of one embodiment of the dynamic adjustment the training object.

Another aspect of the customized training object includes dynamically adjusting the training object based on further information relating to the user identity. For example, performance-based tests may be provided by a simulation program. FIG. 4 illustrates an example of a flowchart of one embodiment a method for dynamically adjusting a training object. The method begins, step 180, by accessing a training object from a knowledge transfer database. Similar to the system of FIG. 1, the database 116 may be accessed to retrieve a training object.

The next step, step 182, is executing a preliminary test included with the training object. A preliminary test may be any suitable test simulating the user environment and user activities. For example, a test may include having a user perform several specific tasks in response to prompts. A software application monitors the results of the test, including the user's ability to perform the specific operations.

The next step, step 184, is to calculate the test results based on the preliminary results. Any suitable designation may be used, such as a binary pass or fail designation or further customized breakdown of the results may be performed based on the user proficiency on specific tasks. Thereupon, the next step, step 186, is to upate the training object based on the test results. In one embodiment, the KTMs and/or KTOs of the learning map may be omitted from the training object because the preliminary test reveals them to be extraneous. In other words, if the user passes all or a portion of the preliminary test, the training object may be dynamically adjusted to reflect executing only KTOs as needed. Therefore, in one embodiment, this method is complete.

Moreover, the dynamic adjustment of training objects may be performed based on user interaction. The learning map may be formatted to be visually displayed, such as using associated meta-data. In one embodiment, a viewer may be used to provide a visual display of the KTMs of the learning map, such as illustrated in the display 200 of FIG. 5. A header 202 indicates the screen includes the information associated with "Learning Map 1." In this exemplary embodiment, five column headings are provided, "title" 204, "mandatory" 206, "duration" 208, "status" 210 and "rating" 212.

Listed in the display 200 are the KTMs that make-up the learning map and include an indication if the KTM is mandatory, the duration of the KTM, whether the KTM has been executed and a possible rating level provided by the user. Illustrated in FIG. 5, the learning map 1 202 includes 22 KTMs, but this is for illustration purposes only and the learning map may have any suitable number of KTMs.

Through interaction with a user in accordance with well known computing activities, a user may select one of the KTMs. Thereupon, a second display 220 may be provided, such as illustrated in FIG. 6. This display includes the header 222 indicating this is a visual display of the KTM 3 of the learning map 1. The specific KTOs of the KTM are then displayed in a similar format to the screen 200 including the headers 224 through 232 and a list of the activities indicating the corresponding KTO.

As noted above, the KTOs are composed of one or more KTA for providing the knowledge transfer specific to the overall learning goal of the KTM and the learning map. In the display 220, the user may thereupon actively select one of the activities to launch the execution of the KTAs. Once a host processing device executes the KTAs of the KTO, the status of the object of the KTO is updated. Therefore, the knowledge transfer object is also dynamically updated based on the user performing different training activities.

The above system may also be fully operational with respect to the user activation of a KTM. Therefore, instead of launching the screen 222 upon the selection of a KTM from the screen 200, the KTM itself may be executed. This execution may thereupon provide for the software to update the KTO status fields (230 of FIG. 5) for all the corresponding KTOs.

Also as discussed above, in one embodiment, a master list may be kept. This master list includes data storage of the indicators representing the executed training operations of the particular user. This master list may also include results associated with preliminary test operations for training objects having the preliminary test. This master list is updated when the user registers the completion of a training activity, such as the completion of a KTM or a KTO. Based on this master list, before a KTM or KTO is executed, this master list may be referenced. If it is determined based on the master list that a particular training activity has already been completed or is extraneous in view of the user's ability, this activity may be disabled. Therefore, a dynamic adjustment of the training object provides for continued customization relative to the user's software usage ability.

Therefore, the generation of training objects allows for the customization of user training. Through general guidelines regarding the user identification, KTOs are assembled to generate the learning map. The usage of a KTO database and the subsequent storage of training objects in a training objects database allows the system to generate the training objects external to the processing device utilizing the new software application. In fact, external services may be provided to generate the training object database based on the associated factors of the user identifications. For example, an information technology department may collectively determine the appropriate training objects for specific users and populate the training object database prior to the users accessing the new software application. The generation of training objects provides the content for customized training to multiple users.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. For example, the knowledge transfer database may be locally disposed with the processing device for immediate access, the database may be accessible via a networked connection or specific training objects may be predisposed in a local memory location functioning as the knowledge transfer database based on the intended user. It is therefore contemplated to cover any and all modifications, variations or equivalents that fall within the scope of the basic underlying principals disclosed and claimed herein.

What is claimed is:

1. A training object generator for generating a training object for customized activities performed using an application software program, the customized activities requiring multiple commands be entered by a user of the application program and the customized activity includes a series of commands not defined by the application software program, the method comprising:
   a knowledge transfer object database having a plurality knowledge transfer objects stored therein; and
   a processing device in operative communication with the knowledge transfer object database, the processing device operative to, in response to the executable instructions:
   based on a user identifier, select a plurality of the knowledge transfer objects (KTOs) from the knowledge transfer object database for each of the customized activities, the plurality of KTOs including KTOs provided with a software application and customized KTOs, the customized KTOs customized for and specific to a company of the user, and at least one KTO selected for each command of each of the customized activities;
   associate at least one command of the application software program for each customized activity of the training object, the command used for determining when to present the training object to the user for the customized activity;
   generate the training object from the plurality of knowledge transfer objects; and
   associate the training object with the user identification.

2. The training object generator of claim 1 further comprising:
   a training database in operative communication with the processing device; and
   the processing device, in response to the executable instructions is further operative to write the training object to the training database.

3. The training object generator of claim 2 wherein the training object is written to the training database in conjunction with the user identification association.

4. The training object generator of claim 1 wherein the user identification includes a user skill level identifier.

5. The training object generator of claim 1 wherein the user identification includes a user usage-type identifier.

6. The training object generator of claim 1 wherein each of the plurality of knowledge transfer objects includes one or more knowledge transfer assets.

7. The training object generator of claim 1 the processing device in response to executable instructions further operative to:
   generate one or more knowledge transfer modules based on the knowledge transfer objects;
   combine the knowledge transfer modules to generate a learning map; and
   combine the learning map with meta-data to generate the training object.

8. A method operable on a computer for generating a training object for customized activities performed using an application software program, the customized activities requiring multiple commands be entered by a user of the application program and the customized activity includes a series of commands not defined by the application software program, the method comprising:
   associating at least one command of the application software program for each customized activity of the training object, the command used for determining when to present the training object to the user for the customized activity;
   selecting a plurality of the knowledge transfer objects (KTOs) based on a user identifier for each of the customized activities, the KTOs including KTOs provided with a software application and customized KTOs, the customized KTOs customized for and specific to a company of the user, and at least one KTO selected for each command of each of the customized activities;
   sorting the knowledge transfer objects into a learning map; and
   associating the learning map of the training object with the user identification.

9. The method of claim 8 further comprising:
   writing the training object to a training database.

10. The method of claim 9 wherein the training object is written to the training database in conjunction with the user identification association.

11. The method of claim 8 wherein the user identification includes a user skill level identifier.

12. The method of claim 8 wherein the user identification includes a user usage-type identifier.

13. The method of claim 8 wherein each of the plurality of knowledge transfer objects includes one or more knowledge transfer assets.

14. The method of claim 13 further comprising:
   generating one or more knowledge transfer objects based on the knowledge transfer objects;
   combining the knowledge transfer objects to generate a learning map; and
   combining the learning map with meta-data to generate the knowledge transfer object.

* * * * *